US006814941B1

United States Patent
Naunheimer et al.

(10) Patent No.: US 6,814,941 B1
(45) Date of Patent: Nov. 9, 2004

(54) SEPARATION PROCESS AND APPARATUS

(75) Inventors: Christopher Naunheimer, Arlington Heights, IL (US); Timothy J. Herppich, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 445 days.

(21) Appl. No.: 09/925,275

(22) Filed: Aug. 9, 2001

(51) Int. Cl.[7] ................................................ F27B 15/00
(52) U.S. Cl. ...................................... 422/147; 422/145
(58) Field of Search ................................ 422/139–147; 55/346, 349, 474, 345, 447, 459.1; 95/271, 275

(56) References Cited

U.S. PATENT DOCUMENTS

| | | | | |
|---|---|---|---|---|
| 2,039,692 A | * | 5/1936 | Van Tongeren | 55/397 |
| 2,535,140 A | | 12/1950 | Kassel | 183/83 |
| 3,738,090 A | * | 6/1973 | Kilian | 406/100 |
| 4,066,533 A | * | 1/1978 | Myers et al. | 208/153 |
| 4,070,159 A | * | 1/1978 | Myers et al. | 422/147 |
| 4,364,905 A | | 12/1982 | Fahrig et al. | 422/144 |
| 4,394,349 A | * | 7/1983 | Cartmell | 422/147 |
| 4,397,738 A | | 8/1983 | Kemp | 208/161 |
| 4,482,451 A | * | 11/1984 | Kemp | 208/161 |
| 4,605,491 A | * | 8/1986 | Haddad et al. | 208/161 |
| 4,634,456 A | * | 1/1987 | Syred et al. | 210/788 |
| 4,670,410 A | | 6/1987 | Baillie | 502/41 |
| 4,701,307 A | | 10/1987 | Walters et al. | 422/147 |
| 4,792,437 A | | 12/1988 | Hettinger, Jr. et al. | 422/147 |
| 4,843,051 A | * | 6/1989 | Kovacs et al. | 502/42 |
| 4,956,091 A | | 9/1990 | Van Den Akker | 210/512.2 |
| 5,190,650 A | * | 3/1993 | Tammera et al. | 210/256 |
| 5,370,844 A | | 12/1994 | Peterson | 422/147 |
| 5,518,695 A | * | 5/1996 | Goodspeed et al. | 422/144 |
| 5,565,020 A | * | 10/1996 | Niewiedzial | 95/271 |
| 5,584,985 A | | 12/1996 | Lomas | 208/113 |

* cited by examiner

Primary Examiner—Kiley Stoner
Assistant Examiner—Kevin McHenry
(74) Attorney, Agent, or Firm—John G. Tolomei; James C. Paschall

(57) ABSTRACT

An apparatus and process is disclosed for the separation of solids from gases and a mixture which is most particularly applicable to an FCC apparatus. The mixture of solids and gases are passed through a conduit and exit through a swirl arm that imparts a swirl motion to centrifugally separate the heavier solids from the lighter gases. The mixture then enters a cyclone through an inlet that has a long, straight sidewall that gradually transitions with a curved outer wall that defines a cyclone barrel and a short, straight sidewall that abruptly transitions with the curved outer wall. The short, straight sidewall is substantially tangentially disposed with respect to a gas recovery conduit which transports a mixture of solids and gases from a reactor conduit. This arrangement provides greater clearance between cyclones and a reactor vessel.

20 Claims, 4 Drawing Sheets

SEPARATION PROCESS AND APPARATUS

BACKGROUND OF THE INVENTION

This invention relates generally to an apparatus and a process for the separation of solid particles from gases. More specifically, this invention relates to the separation of particulate catalyst materials from gaseous materials in an FCC process.

DESCRIPTION OF THE PRIOR ART

Cyclonic methods for the separation of solids from gases are well known and commonly used. A particularly well known application of such methods is in the hydrocarbon processing industry where particulate catalysts contact gaseous reactants to effect chemical conversion of the gas stream components or physical changes in the particles undergoing contact with the gas stream.

The FCC process presents a familiar example of a process that uses gas streams to contact a finely divided stream of catalyst particles and effects contact between the gas and the particles. The FCC processes, as well as separation devices used therein are fully described in U.S. Pat. No. 4,701,307 B1 and U.S. Pat. No. 4,792,437 B1, the contents of which are hereby incorporated by reference.

Efficient separation of particulate catalyst from product vapors is very important in an FCC process. Particulate catalyst that is not effectively separated from product vapors in the FCC unit must be separated downstream either by filtration methods or additional separation devices that multiplicate separation devices utilized in the FCC unit. Additionally, catalyst that is not recovered from the FCC process represent a two-fold loss. The catalyst must be replaced, representing a material cost, and catalyst lost may cause erosion to downstream equipment. Severe erosion may cause equipment failure and subsequent lost production time. Accordingly, methods of efficiently separating particulate catalyst materials from gaseous fluids in an FCC process are of great utility.

In the FCC process, gaseous fluids are separated from particulate catalyst solids as they are discharged from a reaction conduit. The most common method of separating particulate solids from a gas stream uses centripetal separation. Centripetal separators are well known and operate by imparting a tangential velocity to gases containing entrained solid particles that forces the heavier solids particles outwardly away from the lighter gases for upward withdrawal of gases and downward collection of solids.

U.S. Pat. No. 4,397,738 B1 and U.S. Pat. No. 4,482,451 B1 disclose an arrangement for initial quick centripetal separation that tangentially discharges a mixture of gases and solid particles from a central reaction conduit into a containment vessel. The containment vessel has a relatively large diameter and generally provides a first separation of solids from gases. In these arrangements, the initial stage of separation is typically followed by a second more compete separation of solids from gases in a traditional cyclone vessel.

Another method of obtaining this initial quick separation on discharge from the reaction conduit is disclosed in U.S. Pat. No. 5,584,985 B1. This patent discloses the contacting of feed and catalyst particles in a riser conduit. The exit from the riser conduit comprises an arcuate, tubular swirl arm which imparts a swirling, helical motion to the gases and particulate catalyst as they are discharged from the riser conduit into a separation vessel. The swirling, helical motion of the materials in the separation vessel effect an initial separation of the particulate catalyst from the gases. The swirl motion of the mixture continues while it rises up the gas recovery conduit. At the end of the gas recovery conduit, the mixture is drawn into cyclones to effect further separation of the particulate catalyst from the gases. This arrangement is known as the UOP Vortex Separation System ($VSS^{SM}$).

Cyclones for separating particulate material from gaseous materials are well known to those skilled in the art of FCC processing. Cyclones usually comprise an inlet that is tangential to the outside of a cylindrical vessel that forms an outer wall of the cyclone. In the operation of an FCC cyclone, the entry and the inner surface of the outer wall cooperate to create a spiral flow path of the gaseous materials and catalyst that establishes a vortex in the cyclone. The centripetal acceleration associated with an exterior of the vortex causes catalyst particles to migrate towards the outside of the barrel while the gaseous materials enter an interior of the vortex for eventual discharge through an upper outlet. The heavier catalyst particles accumulate on the side wall of the cyclone barrel and eventually drop to the bottom of the cyclone and out via an outlet and a dipleg conduit for recycle through the FCC apparatus. Cyclone arrangements and modifications thereto are generally disclosed in U.S. Pat. No. 4,670,410 B1 and U.S. Pat. No. 2,535,140 B1.

U.S. Pat. No. 4,956,091 B1 discloses a separator comprising a swirl chamber that imparts a swirl motion to a mixture of gases and solids in an angular direction. The mixture then enters a swirl tube through swirl veins which intensify the swirl motion of the mixture in the same angular direction to effect separation between the solids and gases. This same principle has been followed in vortex separation systems that are used in conjunction with cyclones. The angular direction of the swirl motion induced by the $VSS^{SM}$ has the same angular direction as the swirl motion induced by the cyclones. It was, perhaps, thought that consistency between the swirl motion in the $VSS^{SM}$ and the cyclones will operate to intensify the swirl motion in the cyclone and thereby effect greater separation.

U.S. Pat. No. 5,370,844 B1 and U.S. Pat. No. 4,364,905 B1 disclose cyclone inlets that radially extend from and communicate with a central gas recovery conduit. Radially extending cyclone inlets are the most common. However, cyclone inlets of which the long, straight sidewall is disposed just inwardly of a tangent to a central gas recovery conduit have been licensed for commercial use.

Another concern involved in arranging cyclones in a vessel is to provide clearance between cyclones to permit adequate access for installation and for maintenance purposes. Clearance between cyclones becomes a greater consideration when more cyclones are installed in a vessel.

Accordingly, it is an object of the present invention to improve the efficiency of separating particulate solids from vapors in an FCC unit. It is a further object of the present invention to further improve such efficiency of separation in an FCC unit that utilizes a $VSS^{SM}$ with one or more cyclones. An additional object of the present invention is to assure adequate clearance between cyclones in a containing vessel.

BRIEF SUMMARY OF THE INVENTION

It has been discovered that by configuring an inlet to a cyclone so that a short side of the inlet to the cyclone is substantially tangential to a gas recovery conduit which transports a mixture of particulate material and gaseous fluids from a reactor conduit to the cyclone increases separation efficiency and also allows more cyclones to be installed in the containing vessel with greater clearance between the cyclones.

Accordingly, in one embodiment, the present invention relates to a process for the fluidized catalytic cracking of a hydrocarbon feedstock. A hydrocarbon feedstock and solid catalyst particles are passed into a reaction conduit to produce a mixture of solid catalyst particles and gaseous fluids. The mixture of the catalyst particles and gaseous fluids is induced to swirl to decrease the catalyst particle concentration and increase the gaseous fluids concentration in the mixture. The mixture is transported through a gas recovery conduit and passed to at least one cyclone through a cyclone inlet having a short side and a long side. The short side is substantially tangential to a cross-sectional profile of the gas recovery conduit. The mixture is induced in the cyclone to swirl to further decrease the catalyst particle concentration and further increase the gaseous fluids concentration in the mixture.

In another embodiment, the present invention relates to an apparatus for the fluidized catalytic cracking of a hydrocarbon feedstock comprising a reaction conduit for contacting a hydrocarbon feedstock and solid catalyst particles to produce a mixture of solid catalyst particles and gaseous fluids. A gas recovery conduit is in communication with the reaction conduit, and a cyclone is in communication with the gas recovery conduit. The cyclone has an inlet comprising a short side and a long side, and the short side is substantially tangential to a cross sectional profile of the gas recovery conduit.

In a further embodiment, the present invention relates to an apparatus for the fluidized catalytic cracking of a hydrocarbon feedstock comprising a reaction conduit for contacting a hydrocarbon feedstock and solid catalyst particles to produce a mixture of solid catalyst particles and gaseous fluids. A gas recovery conduit is in communication with the reaction conduit for transporting the mixture, and a cyclone is in communication with the gas recovery conduit. The cyclone has a curved outer wall and an inlet comprising a first side and a second side. A first side of the inlet is contiguous with the curved outer wall, and the second side of the inlet is substantially tangential to a cross sectional profile of the gas recovery conduit.

Additional details and embodiments of the invention will become apparent from the following detailed description of the invention.

DESCRIPTION OF THE PREFERRED EMBODIMENT

Figure 1:
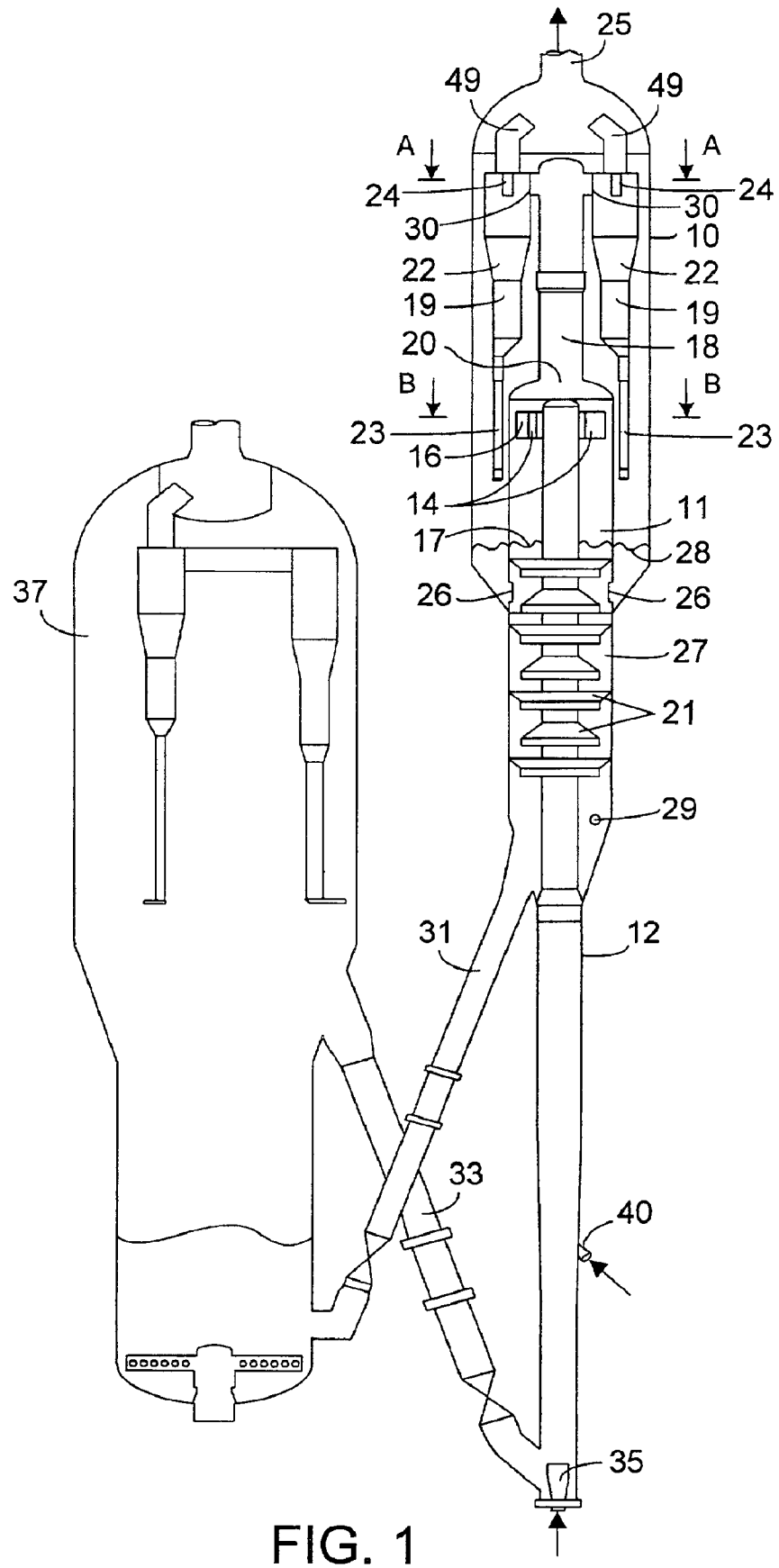
FIG. 1 is a schematic cross-sectional view of an FCC unit.

FIG. 1 is the schematic illustration of an FCC unit that will serve as a basis for illustrating several embodiments. Two alternative cross-sections are taken from segment A—A of FIG. 1 which are FIGS. 2 and 7. Moreover, two alternative cross-sections are taken from segment B—B which are FIGS. 4 and 6. The FCC unit includes a separation arrangement in a reactor vessel 10. A conduit in the form of a reactor riser 12 extends upwardly through a lower portion of the reactor vessel 10 in a typical FCC arrangement. The central conduit or reactor riser 12 preferably has a vertical orientation within the reactor vessel 10 and may extend upwardly through the bottom of the reactor vessel or downwardly from the top of the reactor vessel. Reactor riser 12 terminates in a separation vessel 11 at a swirl exit in the form of a swirl arm 14. The swirl arm 14 is a curved tube that has an axis of curvature that is parallel to the reactor riser 12. (See FIG. 4). The swirl arm 14 also has one end connected to the reactor riser 12 and another open end comprising a discharge opening 16. Swirl arm 14 discharges a mixture of gaseous fluids comprising cracked product and solid catalyst particles through the discharge opening 16. Tangential discharge of gases and catalyst from the discharge opening 16 produces a swirling helical motion about the interior of separation vessel 11. Centripetal acceleration associated with the helical motion forces the heavier catalyst particles to the outer portions of separation vessel 11. Catalyst particles from discharge openings 16 collect in the bottom of separation vessel 11 to form a dense catalyst bed 17. The gases, having a lower density than the solid catalyst particles, more easily change direction and begin an upward spiral with the gases ultimately traveling into a gas recovery conduit 18 through an inlet 20. The gases that enter gas recovery conduit 18 through inlet 20 will usually contain a light loading of catalyst particles. Inlet 20 recovers gases from the discharge openings 16 as well as stripping gases from a stripping section 27 which is hereinafter described. The loading of catalyst particles in the gases entering gas recovery conduit 18 are usually less than 16 kg/m$^3$ (1 lb/ft$^3$) and typically less than 2 kg/m$^3$ (0.1 lb/ft$^3$). The swirl motion imparted by the swirl arm 14 continues in the same angular direction up through the gas recovery conduit 18. Gas recovery conduit 18 passes the separated gases into cyclones 22 that effect a further removal of catalyst particulate material from the gases in the gas recovery conduit 18. Cyclones 22 create a swirl motion inside the cyclones to establish a vortex that separates solids from gases. A product gas stream, relatively free of catalyst particles, exits the cyclones 22 through vapor outlets 24 and outlet pipes 49. The product stream then exits the reactor vessel 10 through outlet 25. Catalyst solids recovered by cyclones 22 exit the bottom of the cyclone through hoppers 19 and diplegs 23 and pass to a lower portion of the reactor vessel 10 where it forms a dense catalyst bed 28 outside the separation vessel 11. Catalyst solids in dense catalyst bed 28 enter a stripping section 27 through windows 26. Catalyst solids pass downwardly through the stripping section 27. A stripping fluid, typically steam, enters a lower portion of stripping section 27 through at least one distributor 29. Counter-current contact of the catalyst with the stripping fluid through a series of stripping baffles 21 displaces product gases from the catalyst as it continues downwardly through the separation vessel 11. Stripped catalyst from stripping section 27 passes through a conduit 31 to a catalyst regenerator 37 that regenerates the catalyst by high temperature contact with an oxygen-containing gas by oxidizing coke deposits from the surface of the catalyst. Following regeneration, catalyst particles enter the bottom of reactor riser 12 through a conduit 33 where a fluidizing gas from a distributor 35 pneumatically conveys the catalyst particles upwardly through the riser 12. As the mixture of catalyst and conveying gas continues up the riser 12, nozzle 40 injects feed into the catalyst, the contact of which vaporizes the feed to provide additional gases that exit through discharge openings 16 in the manner previously described.

Figure 2:
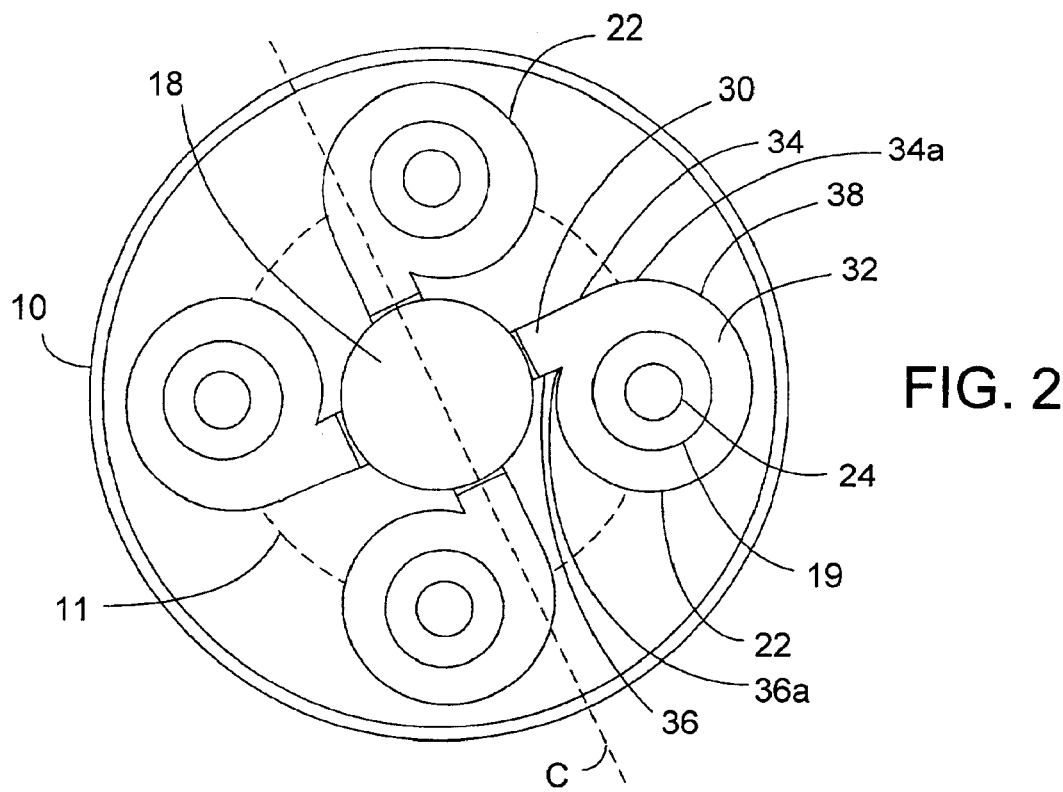
FIG. 2 is a cross-section of FIG. 1 taken along segment A—A.

FIG. 2 illustrates the cyclones 22 in more detail by a cross-sectional view taken along segment A—A in FIG. 1. Each cyclone 22 comprises a radial cyclone inlet 30 and a barrel chamber 32. A vapor outlet 24 disposed in the center of the barrel chamber 32 provides for the exit of product gases along with only fine amounts of particulate material from the cyclone 22. Hopper 19 provides for the discharge of particulate material from the cyclone 22 into the dense catalyst bed 28 as described with respect to FIG. 1. The radial cyclone inlet 30 is defined by a long, straight sidewall 34 and a short, straight sidewall 36. The long, straight sidewall 34 has a continuous, gradual transition 34a to and, preferably, is tangential with a curved outer wall 38 which defines the barrel chamber 32 of the cyclone 22. The short, straight sidewall 36 has an abrupt, acute transition 36a to a curved outer wall 38. The radial cyclone inlet 30 to the cyclones 22 radially exits from the gas recovery conduit 18. Radial exit from the gas recovery conduit 18 to the cyclone 22 is generally characterized in that a mid-line "C" laterally bisecting radial cyclone inlet 30 where it exits gas recovery conduit 18 would substantially intersect the cross-sectional center of the gas recovery conduit 18. In operation, a mixture of gases and particulate material exits gas recovery conduit 18 into the radial cyclone inlet 30 of cyclone 22. The long, straight sidewall 34 and the curved outer wall 38 cooperate to provide a continuous surface which imparts a swirl motion to the mixture entering the cyclone 22 to generate the vortex which separates the particulate material from the gases.

Figure 3:
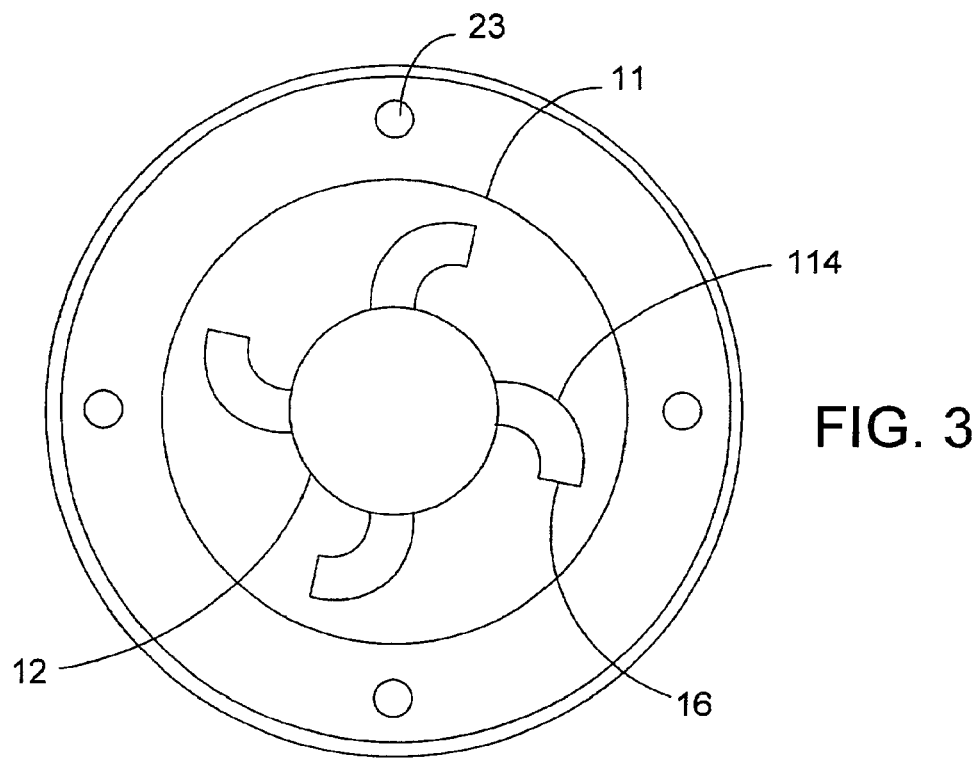
FIG. 3 is a cross-section of FIG. 1 taken along segment B—B.

The orientation of curvature of swirl arms 114 is shown in FIG. 3. FIG. 3 is a cross-sectional view of FIG. 1 taken at segment B—B. A mixture containing particulate material and gaseous fluids ascending through reactor riser 12 will exit the reactor riser 12 through swirl arms 114 out discharge opening 16 swirling in a clockwise angular direction. As the mixture exits the separation vessel 11 and transports through gas recovery conduit 18, the mixture will retain the same swirl motion in a clockwise angular direction.

Figure 4:
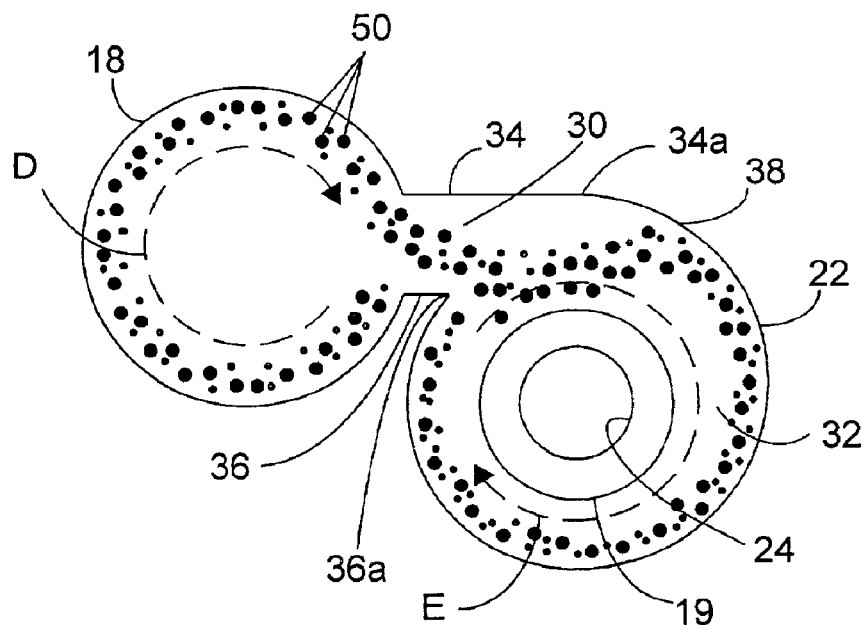
FIG. 4 is a partial view of FIG. 2 showing the flow path of particulate material when the swirl motions are the same.

FIG. 4 shows how particulate material 50 radially exiting the gas recovery conduit 18 enters the cyclone 22. Only one cyclone is shown in FIG. 4 for purposes of simplicity. A swirl motion of clockwise angular direction "D" of the mixture containing particulate material 50 in gas recovery conduit 18 is generated by swirl arms 14 having the orientation of curvature shown in FIG. 3. The orientation of curvature of swirl arm 14 is the angular direction it defines from inlet to outlet. The cyclone 22 has an orientation of curvature defined by the angular direction taken by a continuous, gradual transition 34a between the long, straight sidewall 34 and the curved outer wall 38. The orientation of curvature is determined commensurately with the direction of flow. The orientation of curvature of the cyclone 22 will impart a swirl motion of clockwise angular direction "E" to the mixture containing particulate material 50. When the swirl arms 114 have the same orientation of curvature as the orientation of curvature of the cyclones 22, they impart to the mixture containing particulate material 50 the same swirl motions of clockwise angular direction "D" in the gas recovery conduit 18 and "E" in the cyclone 22, as in the prior art. Consequently, the particulate material 50 entering the cyclone has a tendency to approach the vapor outlet 24 instead of following the interior surface of the curved outer wall 38 to generate the swirl motion desired. Consequently, it is believed that some of the particulate material 50 ends up going out the vapor outlet 24 before it is incorporated into a vortex which serves to separate the particulate material 50 from the gases. Accordingly, separation efficiency of the gas from the particulate material 50 is diminished.

Figure 5:
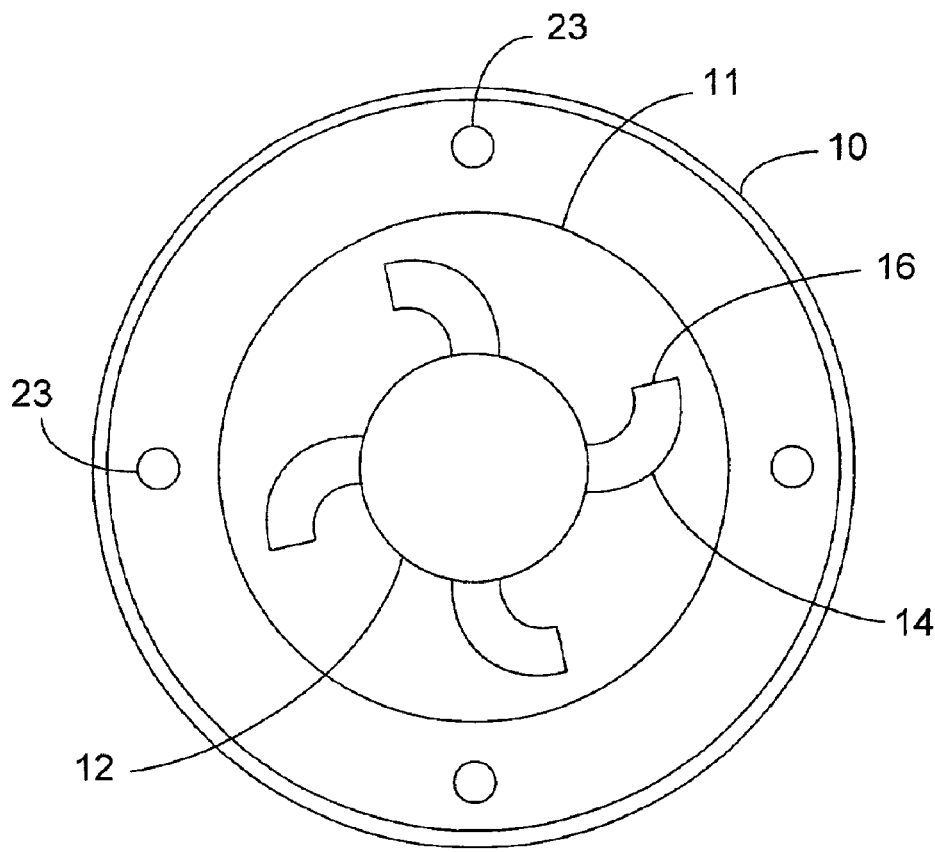
FIG. 5 is an alternative cross-section of FIG. 1 taken along segment B—B.

FIG. 5 is a cross-section of FIG. 1 taken along segment B—B which shows the orientation of curvature of the swirl arms 14 which is counter to the orientation of curvature of the cyclone 22 according to an embodiment of the present invention. The swirl arms 14 in FIG. 5 have an orientation of curvature opposite to that of the swirl arms 114 in FIG. 3. The swirl arms 14 are differentiated from the swirl arms 114 in FIG. 3 by subtracting 100 from the reference numeral. Other elements common to both FIGS. 3 and 5 will be designated with the same reference numeral. The discharge openings 16 in FIG. 5 face oppositely to discharge openings 16 in FIG. 3. Consequently, the orientation of curvature of the swirl arms 14 is counter to the orientation of curvature of the cyclone 22. FIG. 5 shows four swirl arms 14. More or less swirl arms can be used.

Figure 6:
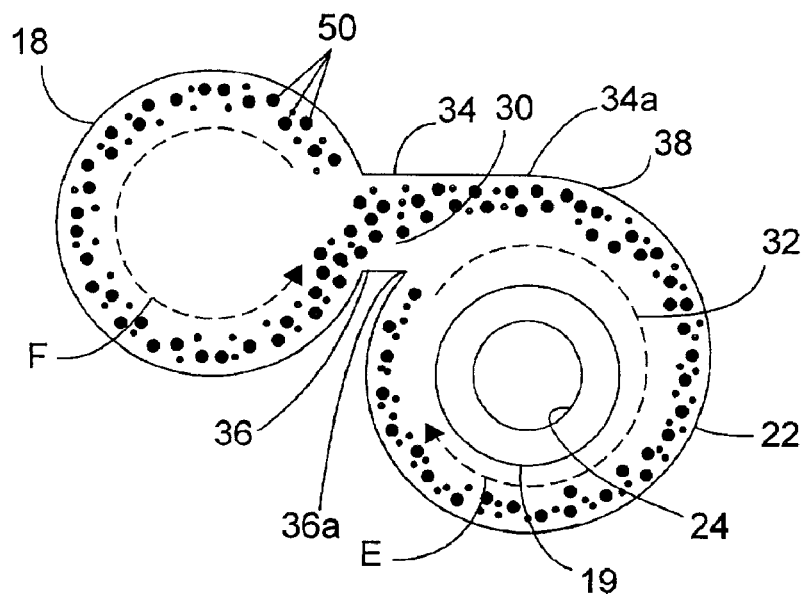
FIG. 6 is a partial view of FIG. 2 showing the flow path of particulate material when the swirl motions are countered.

FIG. 6 demonstrates the interaction between the counter swirling angular directions in the gas recovery conduit 18 and the cyclone 22. FIG. 6 shows the gas recovery conduit 18 and just one cyclone 22 for purposes of simplicity. The mixture exiting discharge openings 16 in the swirl arms 14 in FIG. 5 will swirl in a counter-clockwise angular direction "F". The mixture will continue to swirl in a counter-clockwise motion as the mixture ascends the gas recovery conduit 18. However, the swirl motion in the cyclones 22 shown in FIG. 2 will be in a clockwise angular direction "E". As the mixture containing particulate material 50 enters the radial cyclone inlet 30 of the cyclone 22, the angular momentum of the mixture is carried toward the long, straight sidewall 34, which is contiguous and has a continuous, gradual transition 34a with the curved outer wall 38, instead of toward the center of the barrel chamber 32. The long, straight sidewall 34 and curved outer wall 38 are consequently able to impart a swirl motion of clockwise angular direction "E" to more of the mixture, thereby incorporating more of the mixture in the vortex that separates the particulate material 50 from the gases. The heavier particulate material 50 swirls at the curved outer wall 38 of the cyclone 22 where it eventually falls down to the hopper 19 to enter dipleg 23 and eventually join the dense catalyst bed 28. That the swirl arms 14 swirl the mixture in a counter-clockwise angular direction and the cyclones swirl the mixture in a clockwise angular direction is not a limiting factor, but the counter relationship between the angular directions of swirl motion from the swirl arms 14 and the cyclones 22 is the point of importance.

Figure 7:
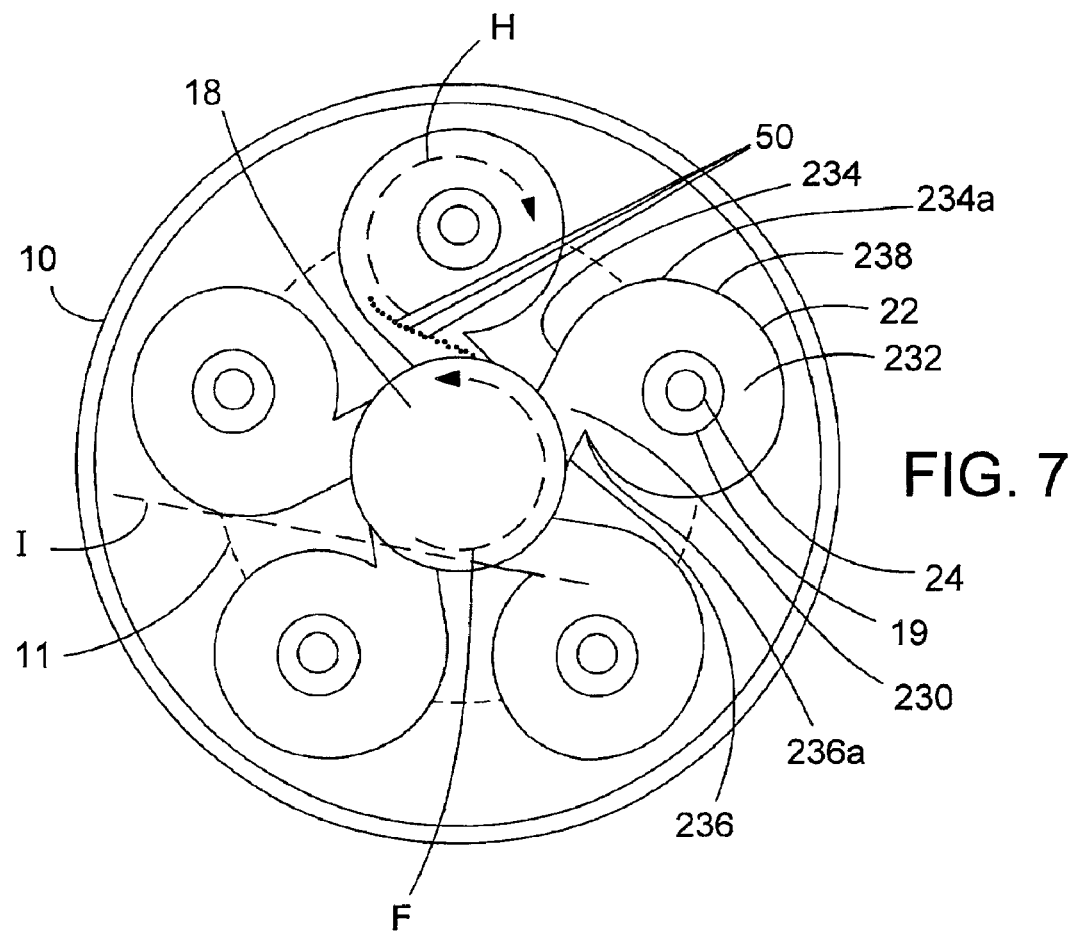
FIG. 7 is a further alternative cross-section of segment A—A in FIG. 1.

FIG. 7 depicts a further embodiment of the present invention that provides substantially tangential exit to the cyclones from the gas recovery conduit 18 and in which the swirl motion of counter-clockwise angular direction "F" of the mixture in the gas recovery conduit 18 is counter to the swirl motion of clockwise angular direction "H" induced in the cyclones. FIG. 7 is taken as an alternative cross-section of FIG. 1 along segment A—A. The reference numeral for each element in FIG. 7 related to an inlet that is configured differently from a corresponding element in FIG. 2 will be designated by adding 200 to the reference numeral in FIG. 2. Other elements common to both FIGS. 2 and 7 will retain the same reference numeral. The section at segment B—B of FIG. 1 that corresponds to the embodiment illustrated in FIG. 7 is illustrated in FIG. 5. Swirl arms 14 impart a swirl motion of counter-clockwise angular direction "F" to the mixture containing particulate material 50 discharging from the reactor riser 12. This counter-clockwise angular direction "F" of swirl motion continues as the mixture travels up gas recovery conduit 18. The mixture exits the gas recovery conduit 18 through cyclone inlets 230 which are substantially tangential to the gas recovery conduit 18. The mixture enters each cyclone 22 through a tangential cyclone inlet 230 defined by long, straight sidewall 234 and short, straight sidewall 236. A line "I" coplanar or co-linear with the short, straight sidewall 236 is substantially tangential to a cross-sectional profile of the gas recovery conduit 18. The short, straight sidewall 236 may be spaced slightly inwardly of tangent to facilitate its welding to the gas recovery conduit 18. This arrangement permits installation of more cyclones 22 in the reactor vessel 10 with greater clearance between each of the cyclones 22. The long, straight sidewall 234 is contiguous and has a continuous, gradual transition 234a with a curved outer wall 238 which defines the barrel chamber 232 of the cyclone 22. The short, straight sidewall 236 has an abrupt, acute transition 236a with the curved outer wall 238. A mixture with a greater concentration of particulate material 50 than that entering the cyclone 22 exits downwardly through hopper 19 while a mixture with a greater concentration of gaseous fluids than that entering the cyclone 22 exits upwardly through vapor outlet 24. The long, straight sidewall 234 and curved outer wall 238 cooperate to impart a swirl motion to the mixture entering cyclone 22, thereby establishing a vortex which separates the particulate material 50 from the gases. In this embodiment, the swirl motion of counter-clockwise angular direction "F" imparted by the swirl arms 14 from the reactor riser 12 is counter to a clockwise angular direction "H" of swirl motion imparted by the cyclones 22. Consequently, the particulate material 50 in the mixture is more likely to first encounter the long, straight sidewall 234 and/or curved outer wall 238 and be subjected to the swirl motion of the vortex than it would be to first encounter the center of the cyclone 22 and be discharged from the cyclone with gases through the vapor outlet 24. Accordingly, because greater proportions of the mixture are likely to be subject to the swirl motion than tending toward the center of the cyclone, greater efficiency in separation is realized. This arrangement also provides counter angular directions of swirl motion in the gas recovery conduit 18 and the cyclones 22, which formerly agreed, by modifying the orientation of the cyclones 22 instead of the swirl arms 114.

EXAMPLE

A reactor vessel was modeled with five cyclones. Inlets to the cyclones comprised a long wall having a continuous, gradual transition to curved outer wall defining the cyclone barrel and a short, straight sidewall which had an abrupt, acute transition to the curved outer wall. The long, straight sidewall was disposed substantially tangential to the gas recovery conduit which transports the mixture from a reactor riser to the cyclones. In an effort to prevent the mixture entering the cyclone from bypassing the vortex therein, the cyclone inlet was made a relatively long 45.7 cm (18 inches). The clearance between cyclones at their largest distance of separation was only 10.7 cm (4.2 inches).

In a separate model, five cyclones were installed in a reactor vessel similar to the previous model with the exception that the length of the short, straight sidewall was only 32.0 cm (12.6 inches) and the short, straight sidewall was disposed substantially tangentially to the gas recovery conduit as shown in FIG. 7. Accordingly, the orientation of curvature of the cyclones in the second model was counter to the orientation of curvature of the cyclones in the first model. However, in the second model, the clearance between cyclones at their largest distance of separation was 45.7cm (18 inches). Accordingly, by reversing the orientation of the cyclones, the clearance between cyclones increases by just under 300%. Hence, the second model provides more flexibility in arranging a given number of cyclones in a reactor vessel in addition to reversing an orientation of curvature of the cyclones to counter the orientation of curvature of the swirl arms at an exit of a reactor conduit to enhance separation efficiency.

The first set of conditions involved a model where radial cyclone inlets 30 to the cyclones 22 were disposed with respect to the gas recovery conduit 18 as shown in FIG. 2 and the swirl arms 114 were disposed as in FIG. 3. This model focused on the case where the angular direction of the swirl motion imparted by the swirl arms was the same as the angular direction of the swirl motion imparted by the cyclones 22 as shown in FIG. 4. The CFD modeling indicated that in this model, 21% of the mixture entering the cyclone veered toward the center of the cyclone instead of veering toward the periphery of the cyclone to join the vortex to further separate the gases from the solids, representing a loss in efficiency.

A second set of conditions had the same cyclone configuration shown in FIG. 2 as in the previous model. However, the swirl arms 14 were oriented as shown in FIG. 5, so that the angular direction of swirl motion generated by the swirl arms 14 was counter to the angular direction of swirl motion generated by the cyclones 22 as shown in FIG. 6. Modeling indicated that only 10% of the mixture entering the cyclone veered toward the center of the cyclone where the vapor outlet is disposed without veering toward the vortex for further separation.

What is claimed is:

1. A process for the fluidized catalytic cracking of a hydrocarbon feedstock comprising:
    passing a hydrocarbon feedstock and solid catalyst particles into a reaction conduit to produce a mixture of solid catalyst particles and gaseous fluids;
    inducing said mixture of said catalyst particles and gaseous fluids to swirl to decrease a catalyst particle concentration and increase a gaseous fluids concentration in said mixture;
    transporting said mixture through a gas recovery conduit;
    passing said mixture from said gas recovery conduit to at least one cyclone through a cyclone inlet having a short side and a long side, said short side being substantially tangential to a cross-sectional profile of said gas recovery conduit and said mixture passing from said gas recovery conduit into said at least one cyclone while swirling toward said long side of said cyclone inlet;
    inducing said mixture in said cyclone to swirl to further decrease the catalyst particle concentration and further increase the gaseous fluids concentration in said mixture.

2. The process of claim 1 wherein said mixture exits said reaction conduit through a swirl arm to induce swirling.

3. The process of claim 1 wherein said cyclone directly communicates with said gas recovery conduit.

4. The process of claim 1 wherein said mixture exits from said reaction conduit into a separation vessel and said gas recovery conduit directly communicates with said separation vessel.

5. The process of claim 1 further including depositing catalyst particles removed from said mixture in said cyclone into a stripping zone, contacting said catalyst particles with a stripping gas in said stripping zone, recovering stripped catalyst particles from said stripping zone and collecting gaseous fluids from said stripping zone.

6. The process of claim 1 wherein said mixture continues to swirl while it is transported to the cyclone.

7. An apparatus for the fluidized catalytic cracking of a hydrocarbon feedstock comprising:

a reaction conduit for contacting a hydrocarbon feedstock and solid catalyst particles to produce a mixture of solid catalyst particles and gaseous fluids;

a gas recovery conduit in communication with said reaction conduit;

a cyclone in communication with said gas recovery conduit, said cyclone having an inlet comprising a short side and a long side, said short side being substantially tangential to a cross sectional profile of said gas recovery conduit and said short side and said long side being parallel to each other.

8. The apparatus of claim 7 wherein said reaction conduit has a swirl exit configured to induce the solid catalyst particles and gaseous fluids to swirl.

9. The apparatus of claim 8 wherein said swirl exit comprises a tubular swirl arm with one end connective with the reaction conduit and an opening at the opposite end.

10. The apparatus of claim 9 wherein said swirl arm curves about an axis that is parallel to said reaction conduit.

11. The apparatus of claim 9 wherein the swirl exit is positioned in a separation vessel.

12. The apparatus of claim 9 wherein a gas recovery conduit communicates the swirl exit of the reaction conduit with the cyclone.

13. The apparatus of claim 8 wherein said cyclone includes a centrally disposed gas outlet, and the swirl exit of the gas recovery conduit induces a first angular direction of swirl that is primarily toward said long side of said cyclone inlet.

14. The apparatus of claim 8 which is a part of an entire fluidized catalytic cracking unit.

15. An apparatus for the fluidized catalytic cracking of a hydrocarbon feedstock comprising:

a reaction conduit for contacting a hydrocarbon feedstock and solid catalyst particles to produce a mixture of solid catalyst particles and gaseous fluids;

a gas recovery conduit in communication with said reaction conduit for transporting said mixture; and a cyclone in communication with said gas recovery conduit, said cyclone having a curved outer wall and an inlet comprising a first side and a second side, a first side of said inlet being contiguous with said curved outer wall and not substantially tangential to a cross sectional profile of said gas recovery conduit and said second side of said inlet being substantially tangential to a cross sectional profile of said gas recovery conduit.

16. The apparatus of claim 15 wherein said reaction conduit has a swirl exit configured to induce the solid catalyst particles and gaseous fluids to swirl.

17. The apparatus of claim 16 wherein said swirl arm curves in an angular orientation counter to the angular orientation in which said outer wall of the cyclone curves.

18. The apparatus of claim 16 wherein said swirl arm curves about an axis that is parallel to said reaction conduit.

19. The apparatus of claim 16 wherein the swirl exit end is positioned in a separation vessel.

20. The apparatus of claim 16 which is a part of an entire fluidized catalytic cracking unit.

* * * * *